United States Patent
Hwang

(10) Patent No.: US 10,018,727 B2
(45) Date of Patent: Jul. 10, 2018

(54) SYSTEM AND METHOD OF SHARING VEHICLE LOCATION INFORMATION, AND COMPUTER READABLE MEDIUM RECORDING THE METHOD OF SHARING VEHICLE LOCATION INFORMATION

(71) Applicant: HYUNDAI MOTOR COMPANY, Seoul (KR)

(72) Inventor: Chang Sik Hwang, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 113 days.

(21) Appl. No.: 15/156,872

(22) Filed: May 17, 2016

(65) Prior Publication Data

US 2017/0146661 A1 May 25, 2017

(30) Foreign Application Priority Data

Nov. 20, 2015 (KR) ........................ 10-2015-0163326

(51) Int. Cl.
| | |
|---|---|
| *G01S 19/06* | (2010.01) |
| *H04W 4/04* | (2009.01) |
| *H04W 4/22* | (2009.01) |
| *H04W 4/90* | (2018.01) |

(52) U.S. Cl.
CPC ............ *G01S 19/06* (2013.01); *H04W 4/046* (2013.01); *H04W 4/22* (2013.01); *H04W 4/90* (2018.02)

(58) Field of Classification Search
CPC .......... G01S 19/06; H04W 4/22; H04W 4/046
See application file for complete search history.

(56) References Cited

U.S. PATENT DOCUMENTS

| 6,061,561 A | 5/2000 | Alanara et al. |
| 6,282,491 B1 | 8/2001 | Bachmann et al. |
| (Continued) | | |

FOREIGN PATENT DOCUMENTS

| DE | 102011111263 A1 | 2/2013 |
| JP | 2001-116556 A | 4/2001 |
| (Continued) | | |

OTHER PUBLICATIONS

Extended European Search Report dated Mar. 30, 2017, issued in European Patent Application No. 16171280.7.

*Primary Examiner* — Mary D Cheung
(74) *Attorney, Agent, or Firm* — McDermott Will & Emery LLP

(57) ABSTRACT

A location information sharing system includes an emergency call system and a navigation system provided in a vehicle, wherein the emergency call system comprises a first initial location calculation unit for generating a first initial location by receiving a global navigation satellite system (GNSS) or a global positioning system (GPS) signal transmitted from a GNSS or GPS satellite, a first compensation location calculation unit for generating a first compensation location compensated from the first initial location, a first transmitting/receiving unit for receiving a second initial location and a second compensation location transmitted from the navigation system, and a first control unit for outputting one location information of the first initial location, the first compensation location, the second initial location, and the second compensation location.

17 Claims, 3 Drawing Sheets

(56) References Cited

U.S. PATENT DOCUMENTS

| | | | |
|---|---|---|---|
| 6,401,036 B1* | 6/2002 | Geier | G01C 21/165 |
| | | | 180/167 |
| 9,386,414 B1* | 7/2016 | Mayor | H04W 4/02 |
| 9,702,964 B2* | 7/2017 | Stahlin | G01S 5/021 |
| 2008/0129547 A1* | 6/2008 | Shinoda | G08G 1/205 |
| | | | 340/991 |
| 2010/0267358 A1 | 10/2010 | Stahlin | |
| 2011/0302214 A1* | 12/2011 | Frye | G06F 17/30247 |
| | | | 707/802 |
| 2013/0282274 A1 | 10/2013 | Hernando | |
| 2013/0288692 A1* | 10/2013 | Dupray | H04W 64/00 |
| | | | 455/450 |

FOREIGN PATENT DOCUMENTS

| | | |
|---|---|---|
| KR | 10-0466459 B1 | 1/2005 |
| KR | 10-2013-0137246 A | 12/2013 |
| KR | 10-2014-0015826 A | 2/2014 |
| KR | 10-2015-0051747 A | 5/2015 |
| KR | 10-2015-0062561 A | 6/2015 |
| KR | 10-2015-0089905 A | 8/2015 |

* cited by examiner

SYSTEM AND METHOD OF SHARING VEHICLE LOCATION INFORMATION, AND COMPUTER READABLE MEDIUM RECORDING THE METHOD OF SHARING VEHICLE LOCATION INFORMATION

CROSS-REFERENCE TO RELATED APPLICATION

This application claims the benefit of priority to Korean Patent Application No. 10-2015-0163326, filed with the Korean Intellectual Property Office on Nov. 20, 2015, the entire contents of which are incorporated herein by reference.

TECHNICAL FIELD

The present disclosure relates to a location information sharing system of a vehicle, sharing location information of the vehicle between an emergency call system for a vehicle and a navigation system, a method of the location information sharing system, and a computer-readable recording medium recording the method.

BACKGROUND

As emergency call systems (also, referred to as eCal system) have been a help in saving lives from traffic accidents if the emergency call system is installed in a vehicle, installation of the emergency call system in all types of vehicle and light trucks has been obligatory in some jurisdictions.

The emergency call system is a device that is installed in a vehicle and automatically requests assistance when a traffic accident occurs. Specifically, when a traffic accident is sensed from a deployment of an airbag, the emergency call system automatically reports an occurrence of an accident and transmits traffic accident information including a location of the accident, the type of vehicle, a driving direction, the type of fuel, and the like to a rescue center using a subscriber identification module (SIM) card installed in the vehicle.

The emergency call system receives location information through a global navigation satellite system (GNSS), or a global positioning system (GPS), antenna and receives power from a battery. Final location information of the accident vehicle provided through the emergency call system requires high reliability since it can shorten time consumed from occurrence of the accident to actual assistance, but when the emergency call system does not normally operate due to malfunction of or damage to a GNSS, or GPS, antenna or when the battery is discharged, final location information of the accidental vehicle cannot be transmitted to the rescue center.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a location information sharing system of which an emergency call system and a navigation system share information of a vehicle location, a method thereof, and a computer-readable recording medium recording the method.

An exemplary embodiment of present disclosure has been made in an effort to provide a location information sharing system that can compensate location information of a vehicle, calculated from an emergency call system and a navigation system, a method thereof, and a computer-readable recording medium recording the method.

Exemplary embodiments of the present disclosure may be used to achieve other objects which are not mentioned in detail in addition to the objects.

A location information sharing system according to an exemplary embodiment of the present disclosure includes an emergency call system and a navigation system provided in a vehicle. The emergency call system includes a first initial location calculation unit generating a first initial location by receiving a global navigation satellite system (GNSS) or a global positioning system (GPS) signal transmitted from a GNSS or a GPS satellite, a first compensation location calculation unit generating a first compensation location compensated from the first initial location, a first transmitting/receiving unit receiving a second initial location and a second compensation location transmitted from the navigation system, and a first control unit outputting one location information of the first initial location, the first compensation location, the second initial location, and the second compensation location.

Here, the emergency call system and the navigation system may be connected to each other through a vehicle network.

In addition, the first compensation location calculation unit may compensate the first initial location based on compensation information transmitted from a dead reckoning system and generating the first compensation location.

The dead reckoning system may include a dead reckoning (DR) module or a gyro sensor.

In addition, the emergency call system may further include a first monitoring unit calculating reliability information of the first initial location based on the received GNSS or GPS signal and monitoring whether or not the first initial location calculation unit normally operates.

The first control unit may output the first initial location or the first compensation location based on the reliability information of the first initial location.

Further, the first transmitting/receiving unit may receive the second initial location, time information of the second initial location, reliability information of the second initial location, and the second compensation location from the navigation system.

The first control unit may output the second initial location or the second compensation location based on the time information of the second initial location and the reliability information of the second initial location.

The navigation system may include a first initial location calculation unit generating a second initial location by receiving a GNSS or GPS signal transmitted from the GNSS or GPS satellite, a second compensation location calculation unit generating a second compensation location compensated from the second initial location, a second transmitting/receiving unit receiving the first initial location and the first compensation location transmitted from the emergency call system, and a second control unit outputting one location information of the first initial location, the first compensation location, the second initial location, and the second compensation location.

According to another exemplary embodiment of the present disclosure, a method for sharing location information using a location information sharing system is provided. The location information sharing system includes an emergency call system and a navigation system provided in a vehicle, and the method includes: generating a first initial location by receiving a global navigation satellite system (GNSS) or a global positioning system (GPS) signal transmitted from a GNSS or a GPS satellite through the emergency call system; generating a first compensation location compensated from the first initial location through the emergency call system; receiving a second initial location and a second compensation location transmitted from the navigation system through the emergency call system; and outputting one location information of the first initial location, the first compensation location, the second initial location, and the second compensation location through the emergency call system.

The method may further include receiving compensation information transmitted from a dead reckoning system through the emergency call system, and the generating the first compensation location may compensate the first initial location and may generate the first compensation location based on the received compensation information.

The first initial location may include time information of the first initial location and reliability information of the first initial location.

The reliability information of the first initial location may be calculated based on the received GNSS or GPS signal.

Further, the outputting the location information may output the first initial location or the first compensation location based on the reliability information of the first initial location.

In addition, the second initial location may include time information of the second initial location and reliability information of the second initial location.

The outputting the location information may output the second initial location or the second compensation location based on the time information of the second initial location and the reliability information of the second initial location when no first initial location is generated.

According to another exemplary embodiment of the present disclosure, a computer-readable recording medium that records a location information sharing method using a location information sharing system is provided. The location information sharing system includes an emergency call system and a navigation system which are connected with each other through a vehicle network, and the computer-readable recording medium includes: a function to generate a first initial location by receiving a global navigation satellite system (GNSS) or a global positioning system (GPS) signal from a GNSS or a GPS satellite through the emergency call system; a function to generate a first compensation location compensated from the first initial location through the emergency call system; a function to receive a second initial location and a second compensation location transmitted from the navigation system; and a function to output one location information of the first initial location, the first compensation location, the second initial location, and the second compensation location.

Here, the function to generate the first compensation location may compensate the first initial location and may generate the first compensation location based on compensation information transmitted from a dead reckoning system.

According to the exemplary embodiments of the present disclosure, location information of a vehicle, calculated from the navigation system can be used in the emergency call system of the vehicle, and location information of the vehicle, calculated in the emergency call system can be used in the navigation system. Further, a location of the vehicle calculated by the emergency call system and the navigation system are compensated to thereby reduce a location error at an area where a satellite signal (e.g., GNSS signal or GPS signal) is not normally received.

DETAILED DESCRIPTION

Figure 1:
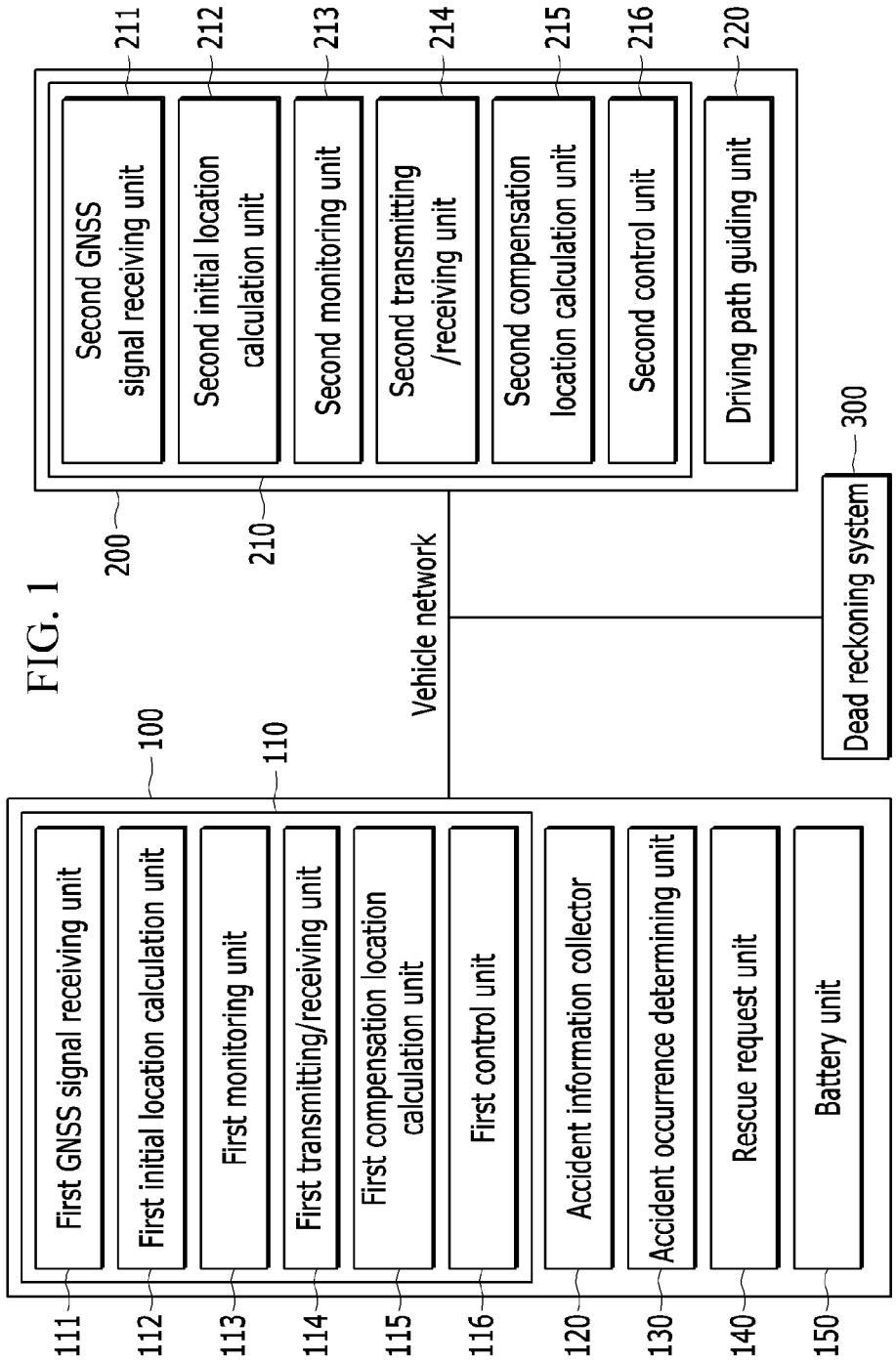
FIG. 1 is a diagram of a location information sharing system according to an exemplary embodiment of the present disclosure.

Hereinafter, exemplary embodiments of the present disclosure so as to be easily practiced by a person skilled in the art to which the present disclosure pertains will be described in detail with reference to the accompanying drawings. As those skilled in the art would realize, the described embodiments may be modified in various different ways, all without departing from the spirit or scope of the present disclosure. In order to clearly describe the present disclosure, portions that are not connected with the description will be omitted. Like reference numerals designate like elements throughout the specification. In addition, the detailed description of the widely known technologies will be o.

In addition, unless explicitly described to the contrary, the word "comprise" and variations such as "comprises" or "comprising" will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

In the specification, first location information may refer to location information of a vehicle, calculated by an emergency call system, and may include first initial location information, time information of the first initial location, reliability information of the first initial location, and first compensation location information. In this case, the first initial location may imply a location calculated based on a received GNSS, or GPS, signal, and the first compensation location may imply a location calculated by compensating the first initial location according to compensation information transmitted from a dead reckoning system.

In the specification, second location information may refer to location information of a vehicle, calculated by a navigation system, and may include second initial location information, time information of the second initial location, reliability information of the second initial location, and second compensation location information. In this case, the second initial location may imply a location calculated based on a received GNSS, or GPS, signal, and the second compensation location may imply a location calculated by compensating the second initial location according to compensation information transmitted from a dead reckoning system.

FIG. 1 is a diagram of a location information sharing system according to an exemplary embodiment of the present disclosure.

The location information sharing system of FIG. 1 may include an emergency call system 100, a navigation system 200, and a dead reckoning system 300, which may be connected with each other through a vehicle network. According to the exemplary embodiment of the present disclosure, the vehicle network may be a controller area network (CAN).

The emergency call system 100 may be installed in a vehicle to sense an occurrence of an accident, may report the accident to a traffic accident handing center, and may send accident information. In this case, the traffic accident handling center may include a police station, a fire station, a hospital, an insurance company, or a tow agency.

The emergency call system 100 may include a first location information generator 110, an accident information collector 120, an accident occurrence determining unit 130, a rescue request unit 140, and a battery unit 150.

The first location information generator 110 may receive a GNSS, or GPS, signal and calculate a first initial location and a first compensation location, and may include a first GNSS signal receiving unit 111, a first initial location calculation unit 112, a first monitoring unit 113, a first transmitting/receiving unit 114, a first compensation location calculation unit 115, and a first control unit 116. As used in this specification, GNSS may also include GPS or may be replaced with GPS.

The first GNSS signal receiving unit 11 may receive a GNSS from a GNSS satellite through an antenna and may transmit the GNSS signal to the first initial location calculation unit 112.

The first initial location calculation unit 112 may calculate a first initial location $GNSS_E$ based on the GNSS signal received from the first GNSS signal receiving unit 111. According to the exemplary embodiment of the present disclosure, the first initial location $GNSS_E$ calculated by the first initial location calculation unit 112 may include calculation time information of the first initial location $GNSS_E$ (also referred to as time information) and an estimated horizontal position error (EHPE) (hereinafter, referred to as reliability information) calculated by the first monitoring unit 113.

The first monitoring unit 113 may monitor a state of the GNSS signal received from the first GNSS signal receiving unit 111 and operation of the first initial location calculation unit 112. According to the exemplary embodiment of the present disclosure, the first monitoring unit 113 may calculate reliability information based on the GNSS signal received from the first GNSS signal receiving unit 111, and determine whether the received GNSS signal is normal based on the reliability information. Specifically, the first monitoring unit 113 may calculate the reliability information according to the number of GNSS satellites, GNSS signal intensity, or a determination result of the GNSS signal state based on the GNSS signal received from the first GNSS signal receiving unit 111. For example, when the reliability information is calculated to be 95% based on the received GNSS signal, an error of a location calculated according to the received GNSS signal is determined to be within about 50 m. That is, it can be determined that a location error calculated by the first initial location calculation unit 112 is low when the reliability information is high and the location error is high when the reliability information is low. In addition, according to the exemplary embodiment of the present disclosure, the first monitoring unit 113 may determine whether the first initial location calculation unit 112 normally operates based on the first initial location $GNSS_E$. Specifically, when the first initial location $GNSS_E$ is calculated by the first initial location calculation unit 112 within a predetermined time range after the GNSS signal is received by the first GNSS signal receiving unit 111, the first initial location calculation unit 112 may be determined to be normally operated. If when the first initial location $GNSS_E$ is not calculated by the first initial location calculation unit 112 within a predetermined time range after the GNSS signal is received by the first GNSS signal receiving unit 111, the first initial location calculation unit 112 may be determined to not be normally operated.

The first transmitting/receiving unit 114 may transmit the first initial location $GNSS_E$ calculated by the first initial location calculation unit 112 to the navigation system 200. Further, the first transmitting/receiving unit 114 may receive compensation information $\Delta G$ from the dead reckoning system 300 and receive a second initial location $GNSS_N$ and a second compensation location ($GNSS_N+\Delta G$) transmitted from the navigation system 200.

The first compensation location calculation unit 115 may compensate the first initial location $GNSS_E$ based on the compensation information $\Delta G$ received from the first transmitting/receiving unit 114 and calculate a first compensation location ($GNSS_E+\Delta G$).

The first transmitting/receiving unit 114 may transmit the first compensation location ($GNSS_E+\Delta G$) calculated by the first compensation location calculation unit 115 to the navigation system 200.

When the first monitoring unit 113 determines that the first initial location calculation unit 112 normally operates, the first control unit 116 may transmit the first initial location $GNSS_E$ or the first compensation location ($GNSS_E+\Delta G$) to the rescue request unit 140 based on the reliability information of the first initial location $GNSS_E$. Further, when the first monitoring unit 113 determines that the first initial location calculation unit 112 abnormally operates, the first control unit 116 may transmit the second initial location $GNSS_N$ or the second compensation location ($GNSS_N+\Delta G$) to the rescue request unit 140 based on time information and reliability information of the second initial location $GNSS_N$ received from the first transmitting/receiving unit 114.

The accident information collector 120 may collect accident information through at least one sensor. In this case, the accident information may include at least one of whether or not air bags have worked, impact amount, impact sound, or abrupt deceleration.

The accident occurrence determining unit 130 may determine whether or not an accident occurred based on the accident information collected by the accident information collector 120. For example, when the impact amount collected by the accident information collector 120 exceeds a predetermined impact amount, the accident occurrence determining unit 130 may determine that an accident occurred.

When an occurrence of an accident is determined by the accident occurrence determining unit 130, the rescue request unit 140 may transmit location information (i.e., one of first initial location, first compensation location, second initial location, and second compensation location) transmitted from the first control unit 116 and the accident information collected by the accident information collector 120 to an traffic accident handling agency through a mobile communication network.

The battery unit 136 may supply power to the emergency call system 100 when no vehicle power is supplied to the emergency call system 100.

The navigation system 200 may be provided in the vehicle to provide a current location of the vehicle and a driving path of the vehicle corresponding to a destination set by a driver, and may include a second location information generator 210 and a driving path guiding unit 220.

The second location information generator 210 may include a second GNSS signal receiving unit 211, a second initial location calculation unit 212, a second monitoring unit 213, a second transmitting/receiving unit 214, a second compensation location calculation unit 215 and a second control unit 216.

The second GNSS signal receiving unit 211 may receive a GNSS signal transmitted from a GNSS satellite through an antenna and transmit the received GNSS signal to the second initial location calculation unit 212.

The second initial location calculation unit 212 may calculate the second initial location $GNSS_N$ based on the GNSS signal received from the second GNSS signal receiving unit 211. According to the exemplary embodiment of the present disclosure, the second initial location $GNSS_N$ calculated by the second initial location calculation unit 212 may include calculation time information of the second initial location $GNSS_N$ (hereinafter, referred to as time information) and EHPH (hereinafter referred to as reliability information) calculated by the second monitoring unit 213.

The second monitoring unit 213 may monitor a state of the GNSS signal received from the second GNSS signal receiving unit 211 and an operation of the second initial location calculation unit 212. According to the exemplary embodiment of the present disclosure, the second monitoring unit 213 may calculate reliability information based on the GNSS signal received from the second GNSS signal receiving unit 211, and determine whether the GNSS signal is normal based on the reliability information. Further, the second monitoring unit 213 may determine whether the second initial location calculation unit 212 normally operates based on the second initial location $GNSS_N$. Here, a method for calculating the reliability information and a method for determining whether the second initial location calculation unit 212 normally operates are the same as those of the first monitoring unit 113, and therefore no further description will be provided.

The second transmitting/receiving unit 214 may transmit the second initial location $GNSS_N$ calculated by the second initial location calculation unit 212 to the emergency call system 100. In addition, the second transmitting/receiving unit 214 may receive compensation information Δ G transmitted from the dead reckoning system 300 and receive the first initial location $GNSS_E$ and the first compensation location ($GNSS_E$+Δ G).

The second compensation location calculation unit 215 may compensate a second initial location $GNSS_N$ based on the compensation information Δ G transmitted from the second transmitting/receiving unit 214 and calculate a second compensation location ($GNSS_N$+Δ G).

The second transmitting/receiving unit 214 may transmit the second compensation location ($GNSS_N$+Δ G) calculated by the second compensation location calculation unit 215 to the emergency call system 100.

When the second monitoring unit 213 determines that the second initial location calculation unit 212 normally operates, the second control unit 216 may transmit the second initial location $GNSS_N$ or the second compensation location ($GNSS_N$+Δ G) to the driving path guiding unit 220 based on the reliability information of the second initial location $GNSS_N$. Further, when the second monitoring unit 213 determines that the second initial location calculation unit 212 abnormally operates, the second control unit 216 may transmit the first initial location $GNSS_E$ or the first compensation location ($GNSS_E$+Δ G) to the driving path guiding unit 220 based on time information and reliability information of the first initial location $GNSS_E$ received from the second transmitting/receiving unit 214.

The driving path guiding unit 220 may output location information (one of first initial location, first compensation location, second initial location, and second compensation location) transmitted from the second control unit 216, and output a driving path corresponding to information of a destination input by the driver.

The dead reckoning system 300 may calculate compensation information Δ G based on speed of the vehicle, a direction angle of the vehicle, and forward/backward gear operation information, and transmits the calculated compensation information Δ G to the emergency call system 100 and the navigation system 200. For example, the dead reckoning system 300 may include a dead reckoning (DR) module or a gyro sensor.

Figure 2:
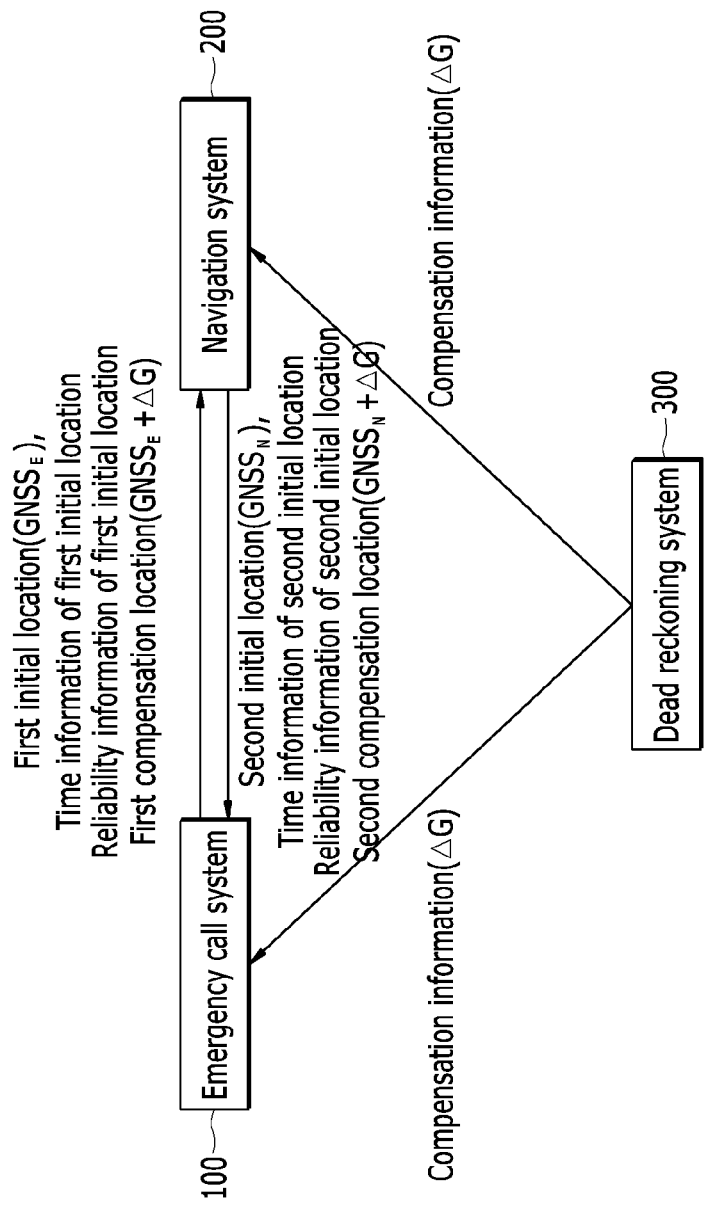
FIG. 2 shows a location information sharing relationship between an emergency call system and a navigation system.

FIG. 2 shows a location information sharing relationship between the emergency call system and a navigation system.

Referring to FIG. 2, the emergency call system 100 may transmit the first initial location $GNSS_E$ calculated by the first initial location calculation unit 112, time information of the first initial location, reliability information of the first initial location, and the first compensation location ($GNSS_E$+Δ G) calculated by the first compensation location calculation unit 115 to the navigation system 200.

The navigation system 200 may transmit the second initial location $GNSS_N$ calculated by the second initial location calculation unit 212, time information of the second initial location, reliability information of the second initial location, and the second compensation location ($GNSS_N$+Δ G) calculated by the second compensation location calculation unit 215 to the emergency call system 100.

The dead reckoning system 300 may transmit compensation information Δ G calculated based on speed of the vehicle, a direction angle of the vehicle, and forward/backward gear operation information to the emergency call system 100 and the navigation system 200.

Figure 3:
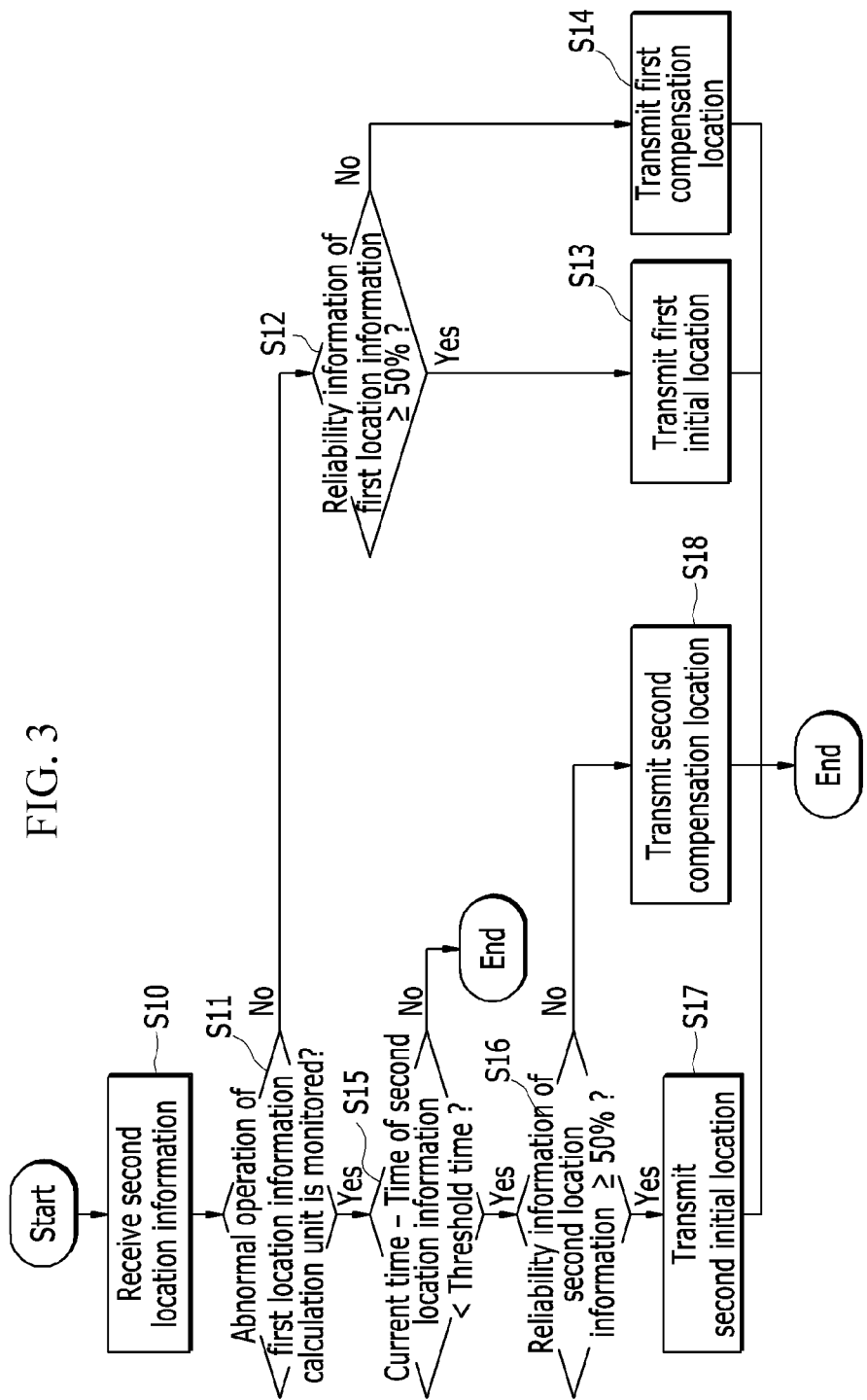
FIG. 3 shows a method for outputting second location information from the emergency call system using the location information sharing system of FIG. 1.

FIG. 3 shows a method for outputting the second location information in the emergency call system using the location information sharing system of FIG. 1.

FIG. 3 illustrates a method for outputting the second location information transmitted from the navigation system 200 when the first location information calculation unit 112 of the emergency call system 100 abnormally operates.

First, the emergency call system 100 may receive the second location information (i.e., second initial location $GNSS_N$ and second compensation location ($GNSS_N$+Δ G)) transmitted from the navigation 200 through the first transmitting/receiving unit 114 (S10).

Next, the first monitoring unit 113 may determine whether the first initial location calculation unit 112 normally operates (S11).

If a result of the determination at S11 shows that the first initial location calculation unit 112 normally operates, the first control unit 116 may determine whether reliability information of the first initial location is greater than or equal to 50% (S12). If the reliability information of the first initial location is greater than or equal to 50%, the first control unit 116 may transmit the first initial location to the rescue request unit 140 (S13), and when the reliability information of the first initial location is less than 50%, the first control unit 116 may transmit the first compensation location to the rescue request unit 140 (S14).

If a result of the determination at S11 shows that the first initial location calculation unit 112 does not normally operate, the first control unit 116 may determine whether the second location information received at S10 is the latest location information (S15). According to the exemplary embodiment of the present disclosure, when a difference between time information of the second location information and current time is less than a predetermined threshold time, the second location information may be determined to be the latest location information.

If a result of the determination at S15 shows that the second location information received at S10 is the latest location information, the first control unit 116 may determine whether a location of the vehicle is updated based on the reliability information of the second location information (S16). According to the exemplary embodiment of the present disclosure, when the reliability information of the second location information is greater than or equal to 50%, the second initial location among the second location information may be transmitted to the rescue request unit 140 (S17).

If a result of the determination at S16 shows that the reliability information of the second location information is less than 50%, it may be determined whether the second compensation location is included in the second location information (S18), and when the second compensation location is included in the second location information, the second compensation location may be transmitted to the rescue request unit 140 (S19).

According to an exemplary embodiment of the present disclosure, a compensation location compensated from an initial location calculated based on a GNSS signal received at an area where a GNSS signal cannot be normally received (e.g., a basement parking area or under a high-level road, and the like) or an area where diffused reflection of the GNSS signal is severe (e.g., a skyscraper area, a mountainous area, and the like) is generated using compensation information transmitted from the dead reckoning system such that accuracy of location information provided through the emergency call system or the navigation system can be improved.

According to an exemplary embodiment of the present disclosure, the emergency call system can transmit the latest location information to the traffic accident handing center based on time information of the first location information or time information of the second location information.

According to an exemplary embodiment of the present disclosure, even when vehicle power is not normally supplied or booting is delayed, a driving path and a current location can be output based on the first location information transmitted from the emergency call system.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A location information sharing system, the system comprising:
   an emergency call system and a navigation system provided in a vehicle,
   wherein the emergency call system comprises:
   a first initial location calculation unit for generating a first initial location by receiving a global navigation satellite system (GNSS) or a global positioning system (GPS) signal transmitted from a GNSS or GPS satellite,
   a first compensation location calculation unit for generating a first compensation location compensated from the first initial location,
   a first transmitting/receiving unit for receiving a second initial location and a second compensation location transmitted from the navigation system, and
   a first control unit for outputting one location information of the first initial location, the first compensation location, the second initial location, and the second compensation location,
   wherein the navigation system comprises a second initial location calculation unit for generating the second initial location by receiving a GNSS, or a GPS signal transmitted from the GNSS or GPS satellite, a second compensation location calculation unit for generating the second compensation location compensated from the second initial location, a second transmitting/receiving unit for receiving the first initial location and the first compensation location transmitted from the emergency call system, and a second control unit for outputting one location information of the first initial location, the first compensation location, the second initial location, and the second compensation location.

2. The location information sharing system of claim 1, wherein the emergency call system and the navigation system are connected to each other through a vehicle network.

3. The location information sharing system of claim 1, wherein the first compensation location calculation unit compensates the first initial location based on compensation information transmitted from a dead reckoning system and generates the first compensation location.

4. The location information sharing system of claim 3, wherein the dead reckoning system comprises a dead reckoning (DR) module or a gyro sensor.

5. The location information sharing system of claim 1, wherein the emergency call system further comprises a first monitoring unit for calculating reliability information of the first initial location based on the received GNSS or GPS signal and monitoring whether or not the first initial location calculation unit normally operates.

6. The location information sharing system of claim 5, wherein the first control unit outputs the first initial location or the first compensation location based on the reliability information of the first initial location.

7. The location information sharing system of claim 1, wherein the first transmitting/receiving unit receives the second initial location, time information of the second initial location, reliability information of the second initial location, and the second compensation location from the navigation system.

8. The location information sharing system of claim 7, wherein the first control unit outputs the second initial location or the second compensation location based on the time information of the second initial location and the reliability information of the second initial location.

9. A method for sharing location information using a location information sharing system that includes an emergency call system and a navigation system provided in a vehicle, comprising:
   generating a first initial location by receiving a global navigation satellite system (GNSS) or a global positioning system (GPS) signal transmitted from a GNSS or a GPS satellite through the emergency call system;
   generating a first compensation location compensated from the first initial location through the emergency call system;
   receiving a second initial location and a second compensation location transmitted from the navigation system through the emergency call system; and outputting one location information of the first initial location, the first compensation location, the second initial location, and the second compensation location through the emergency call system,
wherein the navigation system comprises a second initial location calculation unit for generating the second initial location by receiving a GNSS, or a GPS signal transmitted from the GNSS or GPS satellite, a second compensation location calculation unit for generating the second compensation location compensated from the second initial location, a second transmitting/receiving unit for receiving the first initial location and the first compensation location transmitted from the emergency call system, and a second control unit for outputting one location information of the first initial location, the first compensation location, the second initial location, and the second compensation location.

10. The method for sharing location information of claim 9, further comprising receiving compensation information transmitted from a dead reckoning system through the emergency call system,
wherein the step of generating the first compensation location compensates the first initial location and generates the first compensation location based on the received compensation information.

11. The method for sharing location information of claim 9, wherein the first initial location comprises time information of the first initial location and reliability information of the first initial location.

12. The method for sharing location information of claim 11, wherein the reliability information of the first initial location is calculated based on the received GNSS or GPS signal.

13. The method for sharing location information of claim 11, wherein the step of outputting the location information outputs the first initial location or the first compensation location based on the reliability information of the first initial location.

14. The method for sharing location information of claim 9, wherein the second initial location comprises time information of the second initial location and reliability information of the second initial location.

15. The method for sharing location information of claim 14, wherein the step of outputting the location information outputs the second initial location or the second compensation location based on the time information of the second initial location and the reliability information of the second initial location when no first initial location is generated.

16. A computer-readable recording medium for recording a location information sharing method using a location information sharing system that includes an emergency call system and a navigation system which are connected with each other through a vehicle network, comprising:
a function to generate a first initial location by receiving a global navigation satellite system (GNSS) or a global positioning system (GPS) signal from a GNSS or a GPS satellite through the emergency call system;
a function to generate a first compensation location compensated from the first initial location through the emergency call system;
a function to receive a second initial location and a second compensation location transmitted from the navigation system; and
a function to output one location information of the first initial location, the first compensation location, the second initial location, and the second compensation location,
wherein the navigation system comprises a second initial location calculation unit for generating the second initial location by receiving a GNSS, or a GPS signal transmitted from the GNSS or GPS satellite, a second compensation location calculation unit for generating the second compensation location compensated from the second initial location, a second transmitting/receiving unit for receiving the first initial location and the first compensation location transmitted from the emergency call system, and a second control unit for outputting one location information of the first initial location, the first compensation location, the second initial location, and the second compensation location.

17. The computer-readable recording medium of claim 16, wherein the function to generate the first compensation location compensates the first initial location and generates the first compensation location based on compensation information transmitted from a dead reckoning system.

* * * * *